United States Patent
Miyazaki et al.

(10) Patent No.: US 6,311,328 B1
(45) Date of Patent: *Oct. 30, 2001

(54) APPARATUS AND METHOD FOR ENLARGING/REDUCING A VIDEO PICTURE SIZE

(75) Inventors: Shinichiro Miyazaki; Akira Shirahama, both of Kanagawa; Takeshi Ono, Saitama; Nobou Ueki, Chiba, all of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 18 days.

(21) Appl. No.: 08/867,768

(22) Filed: Jun. 3, 1997

(30) Foreign Application Priority Data

Jun. 5, 1996 (JP) ............................ P08-165209

(51) Int. Cl.$^7$ ............................ H04N 1/393; H04N 5/46; G09G 3/00

(52) U.S. Cl. ............................ 725/37; 348/561; 348/581; 348/458; 345/129; 345/130; 358/451; 382/298; 382/300

(58) Field of Search ............................ 348/561, 581–582, 348/704, 458, 455, 915; 345/129, 130, 135; 382/298–300, 28, 299; 358/451

(56) References Cited

U.S. PATENT DOCUMENTS

| | | | |
|---|---|---|---|
| 4,528,585 | * 7/1985 | Bolger | 358/22 |
| 4,532,602 | * 7/1985 | DuVall | 382/300 |
| 5,031,044 | * 7/1991 | Canfield et al. | 358/183 |
| 5,047,857 | * 9/1991 | Duffield et al. | 348/561 |
| 5,107,334 | * 4/1992 | Matsumoto | 348/561 |
| 5,285,282 | * 2/1994 | Cavazos et al. | 348/561 |
| 5,323,173 | * 6/1994 | Sakuma et al. | 345/131 |
| 5,384,904 | 1/1995 | Sprague et al. | |
| 5,532,753 | * 7/1996 | Buchner et al. | 348/569 |
| 5,561,725 | * 10/1996 | Degi et al. | 382/298 |
| 5,574,572 | * 11/1996 | Malinowski et al. | 382/298 |
| 5,648,795 | * 7/1997 | Vouri et al. | 345/132 |
| 5,661,824 | * 8/1997 | Allebach et al. | 382/298 |
| 5,673,086 | * 9/1997 | Fukuoka et al. | 348/445 |
| 5,675,753 | * 10/1997 | Hansen et al. | 395/333 |
| 5,686,969 | * 11/1997 | Baik | 348/556 |
| 5,696,530 | * 12/1997 | Maejima | 345/327 |
| 5,706,451 | * 1/1998 | Lightbody et al. | 395/327 |
| 5,719,594 | * 2/1998 | Potu | 345/130 |
| 5,721,565 | * 2/1998 | Nguyen | 345/327 |
| 6,008,860 | * 12/1999 | Patton et al. | 345/565 |

FOREIGN PATENT DOCUMENTS 2183961  6/1987  (GB) .

* cited by examiner

*Primary Examiner*—Andrew Faile
*Assistant Examiner*—Reuben M. Brown
(74) *Attorney, Agent, or Firm*—Jay H. Maioli

(57) ABSTRACT

A picture processing apparatus for picture-in-picture applications where the number of pixels n in the horizontal direction of an original picture, the number of pixels m in the vertical direction thereof, the number of pixels N in the horizontal direction of the converted picture, and the number of pixels M in the vertical direction thereof are supplied to a dividing device. Thus, ratios A=N/n and B=M/m are obtained. The inverse number 1/A of the value A is cumulated by circuits. An address generating circuit generates addresses at four points for calculating a density value a of a converted pixel corresponding to the integer part of a cumulated value $\Sigma(1/A)$. These addresses are supplied to memories. The pixel data at the four points that are read from the memories are supplied to respective multiplying devices. The decimal part of the value $\Sigma(1/A)$ is supplied as an interpolating coefficient p to a multiplying device. A coefficient (1−q) is supplied to a multiplying device. Likewise, in the vertical direction, coefficients q and (1−q) are supplied to respective multiplying devices. These multiplying devices and adding devices perform operations. Thus, the density value a of the converted pixel is obtained and supplied from a terminal.

10 Claims, 8 Drawing Sheets

APPARATUS AND METHOD FOR ENLARGING/REDUCING A VIDEO PICTURE SIZE

BACKGROUND OF THE INVENTION

1. Field of the Invention

The present invention relates to a picture processing apparatus that allows a picture to be enlarged/reduced at any ratio and that is used for a special effect unit in a broadcasting station or the like, a television receiver, or a video tape recorder and to a picture processing method.

2. Description of the Related Art

In home-use television receivers, a so-called picture-in-picture system and the picture-and-picture system of which a reduced or enlarged screen is displayed along with an original screen has been practically used. The picture-in-picture consists of a smaller sub picture than the main picture framed and displayed on an original screen (main picture). On the other hand, the picture-and-picture consists of a plurality of a small pictures arranged and displayed. In the picture-in-picture system and the picture-and-picture system, another screen is reduced or enlarged at any fixed ratio that is a multiple of the size of the original screen. Thus, by simply filtering and thinning out pixels of an original screen to be reduced (enlarged), a reduced or enlarged picture can be obtained almost without deterioration of the picture quality thereof.

FIG. 5 shows an example of the structure of a filter for reducing/enlarging a picture corresponding to a prior art reference. In FIG. 5, a horizontal interpolating filter 101 is a low-pass filter. The horizontal interpolating filter 101 is composed of one-pixel delaying devices D, coefficient multiplying devices, and an adding device. A vertical filter 102 is low-pass filter. The vertical filter 102 is composed of one-line delaying devices H, coefficient multiplying devices, and an adding device.

When a picture is reduced, picture data received from a terminal 100 is supplied to the horizontal interpolating filter 101 and the vertical interpolating filter 102. The horizontal interpolating filter 101 and the vertical interpolating filter 102 interpolate the picture data in the horizontal direction and the vertical direction, respectively. Pixels of the resultant picture data are thinned out at a predetermined reducing rate and then written to a field memory 103. When the picture size is reduced to ½ each in the horizontal direction and the vertical direction, every second pixel in the horizontal direction and every second line in the vertical direction of picture data is written to the field memory 103. The reduced picture data is read from the field memory 103 and supplied to a terminal 104.

When picture data is enlarged, picture data of which dummy data has been placed in the horizontal direction and the vertical direction at predetermined intervals is received from the terminal 100. The resultant picture data is interpolated in the horizontal direction and the vertical direction and written to the field memory 103.

In the picture reducing process for interpolating and thinning out pixels of picture data by such a filter, when the reducing ratio of the size of the original picture to the size of the reduced picture is a ratio of simple integers, pixels of picture data can be easily thinned out. Thus, the picture data can be reduced with a relatively high picture quality. This property also applies to the picture enlarging process. However, in the case that the size of a reduced picture can be freely set up, the reducing ratio does not become a ratio of simple integers. In this case, since it is difficult to equally thin out pixels, the picture quality is deteriorated. For example, inclined lines of a reduced picture are not smoothly displayed. Likewise, in the picture enlarging process, such a situation takes place. In particular, when the ratio of the size of the original picture size to the size of the reduced/enlarged picture is ½ to 1 or more than 1, the picture quality is remarkably deteriorated.

As a method for enlarging or reducing a picture at any ratio without a deterioration of the picture quality, for example a linear interpolating method is known. Now, assume that an original picture is sampled as m pixels and n pixels in the horizontal direction and vertical direction, respectively. In addition, consider the case that the picture composed of m×n pixels is enlarged to a picture composed of M pixels in the horizontal direction and N pixels in the vertical direction.

According to such a method, a reverse mapping process of which the coordinates of a converted pixel are correlated to the original coordinates thereof. FIG. 6 shows that a pixel a of a converted picture is reversely mapped to the original coordinates thereof. The pixel shown by a black point "●" shows a pixel a which is reversely mapped to the original coordinates. The pixel shown by a white point "○" shows an original pixel. The density value of a pixel a of the converted picture (hereinafter, "density value of pixel a" is referred to as "density value a") is obtained by multiplying the density values of the pixel a at original four adjacent points thereof by the inverse numbers of the distances between the pixel a. In other words, when the density value of the pixel at each point is represented in the form d(x, y), the density value a is expressed by the following formula (1).

$$a=(1-q)(1-p)\times d(x,y)+(1-q)p\times d(x+1,y)+q(1-p)\times d(x,y+1)+qp\times d(x+1,y+1) \quad (1)$$

With such an interpolating process, when a picture is enlarged or reduced at any ratio rather than a multiple, for example inclined lines can be smoothly displayed with less picture deterioration. With this method, the coefficients p and q should be calculated for each pixel.

FIG. 7 shows the relation between an original picture and a converted picture. In this example, the original picture composed of m×n pixels is converted into an enlarged picture composed of M×N pixels (m<M, n<N). In this case, the enlarging/reducing ratio A in the horizontal direction and the enlarging/reducing ratio B in the vertical direction are obtained by the following formulas (2) and (3), respectively.

$$A=N/n \quad (2)$$

$$B=M/m \quad (3)$$

By dividing the coordinates (X, Y) of a pixel of the converted picture by the converting ratios A and B, the coordinates of which the pixel is reversely mapped to the original coordinates can be obtained. Thus, as described above, the density value of a converted pixel (X, Y) is calculated corresponding to the density values of pixels at original four adjacent pixel positions (x, y), (x+1, y), (x, y+1), and (x +1, y+1) of which the pixel (X, Y) is reversely mapped to the original coordinates and to the distances between four points and the coordinates upon reversely mapping.

When the pixel (X, Y) is reversely mapped to the original coordinates, the position of the original coordinates thereof can be represented corresponding to the converting ratios A and B with the following formulas (4) and (5).

$$x/A = X_1.P_x \quad (4)$$

$$y/B = Y_1.q_y \quad (5)$$

In the formulas (4) and (5), $X_1$ and $Y_1$ represent coordinates of which a pixel has been converted; $p_x$ and $q_y$ represent interpolating coefficients; and "." between $X_1$ and $p_x$ and between $Y_1$ and $q_y$ represents a decimal point. In other words, $X_1$ and $Y_1$ are integer parts of the calculated results of x/A and y/B. $p_x$ and $q_y$ that represent interpolating coefficients are decimal parts. Thus, decimal parts of which the position of a converted pixel does not accord with the position of the original pixel are used as interpolating coefficients.

FIG. 8 shows an example of the structure for enlarging/reducing a picture corresponding to such operations and the calculated results by the linear interpolating method. Memories 110a, 110b, 110c, and 110d are random access memories. Original picture data (not shown) is written to the memories 110a, 110b, 110c, and 110d. An address generating circuit 117 supplies an address signal to the memories 110a, 110b, 110c, and 110d. Thus, data of a pixel is read from the memories 110a, 110b, 110c and 110d.

The number of pixels N in the horizontal direction of which a picture has been enlarged or reduced and the number of pixels n in the horizontal direction of an original picture are supplied to terminals 112 and 113, respectively. The number of pixels N and the number of pixels n are supplied to a dividing device 114. The dividing device 114 outputs an enlarging/reducing converting ratio A. At this point, to simplify the processes of downstream stages, n/N is calculated and thereby 1/A is obtained. The inverse number 1/A of the converting ratio is supplied to a high speed multiplying device 115 that performs a multiplying operation corresponding to a count value received from a horizontal coordinate counter 116.

The horizontal coordinate counter 116 successively generates a count value that represents the coordinate x of a pixel in the horizontal direction of the original picture. The count value is supplied to the high speed multiplying device 115. The high speed multiplying device 115 multiplies the coordinate x represented with the count value by the inverse number 1/A of the above-described converting ratio and outputs x/A. As described above, the integer part of the result of x/A is supplied as the converted coordinate $X_1$ to the address generating circuit 117. The decimal part of the result x/A is supplied as an interpolating coefficient p to multiplying devices 119a and 119b. In addition, the decimal part is supplied to an inverting circuit 118 that outputs the complement of '1' of the received data. Thus, the inverting circuit 118 outputs a value 1−p. The value 1−p is supplied to multiplying devices 119c and 119d.

The vertical direction of the picture is processed in the same manner as the horizontal direction thereof. In other words, the number of pixels m in the vertical direction of the original picture and the number of pixels M in the vertical direction of the converted picture are received from terminals 120 and 121, respectively. The number of pixels m and the number of pixels M are supplied to a dividing device 122. The dividing device 122 calculates m/M and outputs the inverse number 1/B of the converting ratio. The inverse number 1/B is supplied to a multiplying device 123. The multiplying device 123 receives a count value that represents the coordinate y from a vertical coordinate counter 124 that successively generates a count value that represents a pixel y in the vertical direction of the original picture. The multiplying device 123 multiplies the coordinate y represented with the count value by the inverse number 1/B of the above-described converting ratio and outputs y/B. The integer part of the multiplied result is supplied as the converted coordinate $Y_1$ to the address generating circuit 117 along with the converted coordinate $X_1$. The decimal part of the multiplied result is supplied as an interpolating coefficient q to the multiplying devices 119a and 119c. In addition, the decimal part is supplied to an inverting circuit 125 that outputs 1−q as the complement of '1' of the received data. The value 1−q is supplied to the multiplying devices 119b and 119d.

The address generating circuit 117 generates addresses for reading pixel data at four points of an original picture used upon obtaining a density value of converted coordinates from the memories 110a, 110b, 110c, and 110d corresponding to the supplied coordinates $X_1$ and $Y_1$. In other words, the address generating circuit 117 generates addresses ($x_1$, $y_1$), ($x_1$+1, $y_1$), ($x_1$, $y_1$+1), and ($x_1$+1, $y_1$+1) for reading pixel data of coordinates ($x_1$, $y_1$), ($x_1$+1, $Y_1$), ($x_1$, $y_1$+1), and ($x_1$+1, $y_1$+1) corresponding to the supplied coordinates $X_1$ and Y1. The generated addresses are supplied to the memories 110a, 110b, 110c, and 110d.

Corresponding to the supplied addresses, pixel data (density values) of the coordinates ($x_1$, $y_1$), ($x_1$+1, $y_1$), ($x_1$, $y_1$+1), and ($x_1$+1, $y_1$+1) are read from the memories 110a, 110b, 110c, and 110d, respectively. Since the density values at the four points should be read at the same time, the four memories 110a, 110b, 110c, and 110d to which the same original picture data is written are required. The density values d($x_1$, $y_1$), d($x_1$+1, $y_1$), d($x_1$, $y_1$+1), and d($x_1$+1, $y_1$+1) are supplied to multiplying devices 126a, 126b, 126c, and 126d, respectively.

The multiplying devices 119a, 119b, 119c, and 119d to which interpolating coefficients and complement of '1' thereof are supplied, the multiplying devices 126a, 126b, 126c, and 126d to which density values are supplied, and the adding devices 127a, 127b, and 128 perform the operation expressed by the formula (1) and obtains density values of pixels that have been converted.

However, in the conventional structure shown in FIG. 8, to obtain interpolating coefficients, dividing devices and multiplying devices (including a high speed multiplying device) in the horizontal and vertical directions are required. Since the dividing devices and high speed multiplying device have many gates, they cause the cost of an IC for the apparatus to increase.

In addition, when a plurality of screens that have been converted at any ratio are displayed on the same display, dividing devices and multiplying devices in the horizontal and vertical directions are required for each screen. Thus, to generate coefficients for the linear interpolating process, the circuit scale becomes large, thereby increasing the cost of the apparatus.

OBJECTS AND SUMMARY OF THE INVENTION

Therefore, an object of the present invention is to provide a picture processing circuit that allows a picture to be enlarged/reduced at any ratio as a picture-in-picture system and so on of for example a television receiver with a small circuit scale and a processing method thereof.

The present invention is a picture processing apparatus for enlarging/reducing each pixel of digital data at any ratio, comprising a means for obtaining a converting ratio such that the number of pixels of an original picture to be reduced/enlarged is a denominator and the number of pixels of the converted picture is a numerator, a cumulating means for cumulating an inverse number of the converting ratio, a position information generating means for generating position information for obtaining original pixel data to be interpolated corresponding to a value of an integer part of the result of the cumulating means, and a interpolating means for interpolating the original pixel data so as to obtain a value of the converted pixel, wherein a decimal part of the result of the cumulating means is used as an interpolating coefficient for interpolating the original pixel data.

The present invention is a picture processing method for enlarging/reducing each pixel of digital data at any ratio, comprising the steps of obtaining a converting ratio such that the number of pixels of an original picture to be reduced/enlarged is a denomionator and the number of pixels of the converted picture is a numerator, cumulating an inverse number of the converting ratio, generating position information for obtaining original pixel data to be interpolated corresponding to a value of an integer part of the result of the cumulating step, and interpolating the original pixel data so as to obtain a value of the converted pixel, wherein a decimal part of the result of the cumulating step is used as an interpolating coefficient for interpolating the original pixel data.

As described above, according to the present invention, corresponding to the cumulated result of the inverse number of the converting ratio of a picture that is enlarged or reduced, position information of a pixel of a converted picture and interpolating coefficients are obtained. Thus, with a relatively small scale circuit structure, picture data can be enlarged or reduced at any converting ratio.

The above, and other, objects, features and advantages of the present invention will become readily apparent from the following detailed description thereof which is to be read in connection with the accompanying drawings.

DETAILED DESCRIPTION OF THE PREFERRED EMBODIMENTS

Next, an embodiment of the present invention will be described. According to a picture processing apparatus of the present invention, when interpolating coefficients for enlarging or reducing a picture are obtained, the enlarging/reducing ratio is obtained in such a manner such that the number of pixels of the original picture is a denominator and the number of pixels of the converted picture is a numerator. By cumulating the inverse numbers of the obtained ratios, an interpolating coefficient for linearly interpolating each pixel is obtained.

Figure 1:
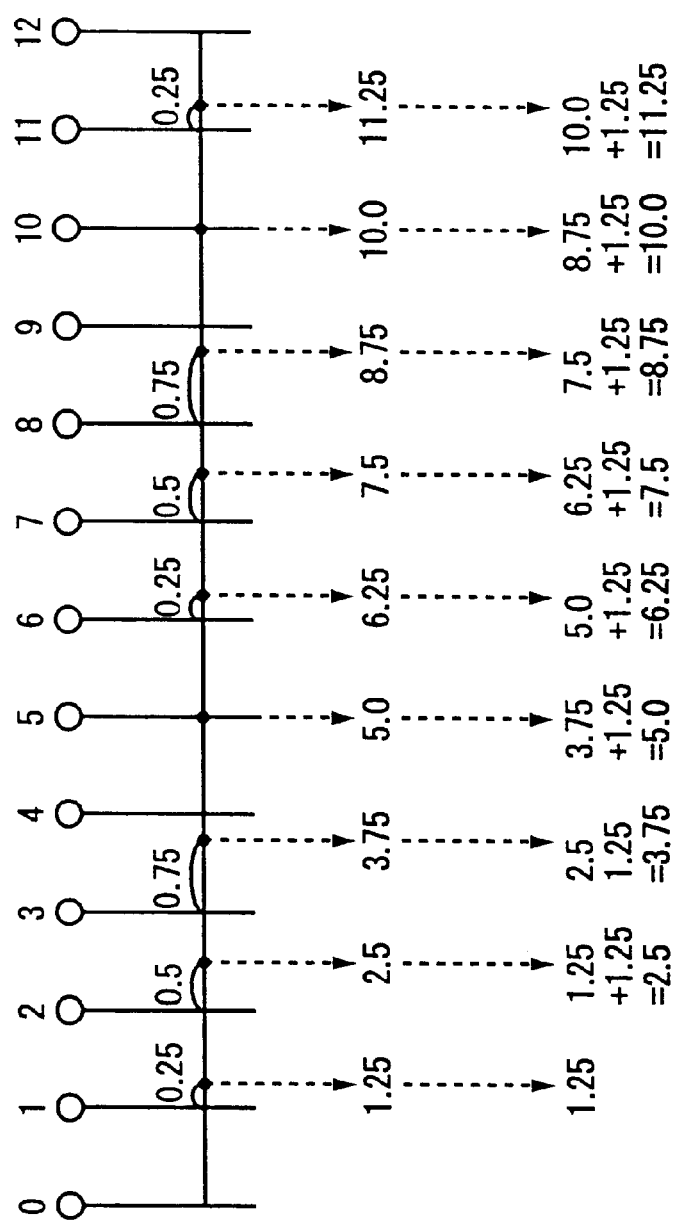
FIGS. 1A to 1D are schematic diagrams showing the case that pixels in the horizontal direction of a converted picture are reversely mapped to coordinates of an original picture.

In the linear interpolating process, when picture data is divided into the horizontal direction and the vertical direction, an interpolating coefficient p in the horizontal direction is obtained by calculating the distance between a pixel that has been converted (enlarged or reduced) and the original pixel thereof. This distance varies at a constant ratio. FIG. 1 shows an example of which pixels of a converted picture are reversely mapped to the coordinates of the original picture in the horizontal direction for one line. In this example, the size of the original picture is reduced by 0.8 times. Assuming that the effective number of pixels in the horizontal direction of the original picture is 640, the effective number N of pixels of the converted picture is 512. The inverse number 1/A of the converting ratio in the horizontal direction becomes 640/512=1.25 by performing the operation of n/N.

The size of the original picture shown in FIG. 1A is reduced by 0.8 times. The converted picture is reversely mapped to the coordinates of the original picture as shown in FIG. 1B. A converting ratio A for reducing the size of the pixels is obtained. The inverse number 1/A of the converting ratio is cumulated as a cumulative converting ratio $\Sigma(1/A)$. Thus, the reversely mapped position of the converted pixel to the original picture is obtained. Corresponding to this position, the interpolating coefficient p can be obtained.

In the example shown in FIG. 1A, with reference to the pixel 0 of the original picture, it is reduced. After the original picture is converted, a pixel corresponding to the pixel 1 of the original picture is reversely mapped to a position with a distance of 1/0.8=1.25 pixels from the pixel 0 of the original picture. FIG. 1C shows the distance of the reversely mapped position from the pixel 0 of the original picture. From FIG. 1C, it is clear that the interpolating coefficient p of the pixel of the converted picture is 1.25−1=0.25.

For the pixel 2 of the original picture, as shown in FIG. 1D, the inverse number 1/A of the converting ratio is cumulated. After the picture is converted, a pixel corresponding to the pixel 2 of the original picture is reversely mapped to a position with a distance of 1.25+1.25=2.5 pixels from the pixel 0 of the original picture. Thus, the interpolating coefficient p becomes 2.5−2=0.5. Likewise, the inverse number 1/A of the converting ratio is cumulated. After the picture is converted, the pixel 3 of the original picture is inversely mapped to a position with a distance of 1.25+1.25+1.25=3.75 pixels from the pixel 0 of the original picture. Thus, the interpolating coefficient p becomes 3.75−3=0.75.

Figure 2:
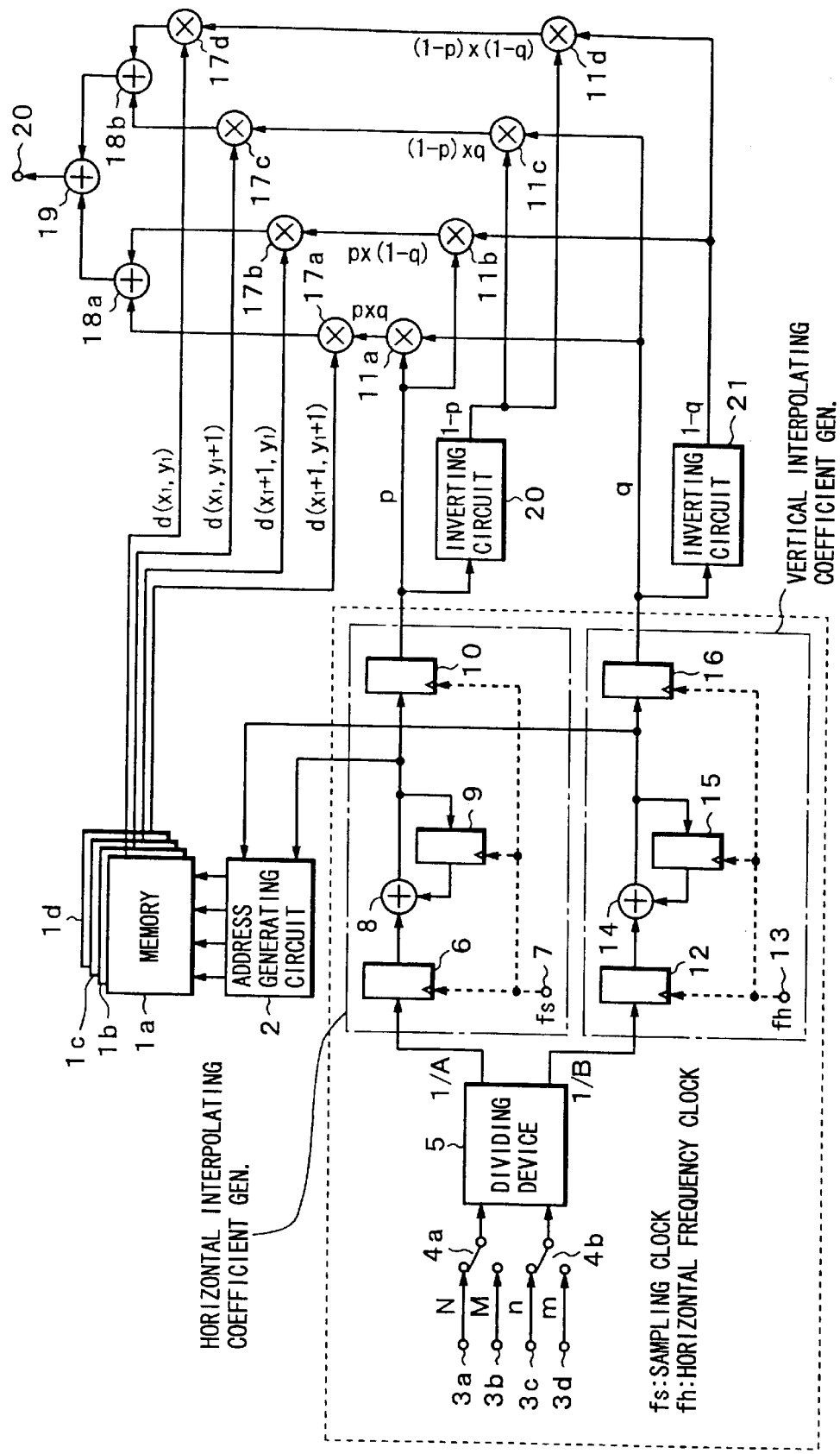
FIG. 2 is a block diagram showing an example of the structure of a picture processing apparatus according to an embodiment of the present invention.

FIG. 2 shows an example of the structure of a picture processing apparatus for enlarging/reducing a picture by a method for cumulating the inverse number of a converting ratio and obtaining an interpolating coefficient corresponding to the present invention. Memories 1*a*, 1*b*, 1*c*, and 1*d* are random access memories. Original picture data (not shown) to be converted is written to the memories 1*a*, 1*b*, 1*c*, and 1*d*. An address signal is supplied from an address generating circuit 2 to the memories 1*a*, 1*b*, 1*c*, and 1*d*. Thus, data of a particular pixel corresponding to the supplied address signal is read from the picture data.

The number of pixels N in the horizontal direction of the converted picture data and the number of pixels M in the vertical direction thereof are received from terminals 3a and 3b, respectively. The number of pixels n in the horizontal direction of the original picture and the number of pixels m in the vertical direction thereof are received from terminals 3c and 3d, respectively.

Figure 3:
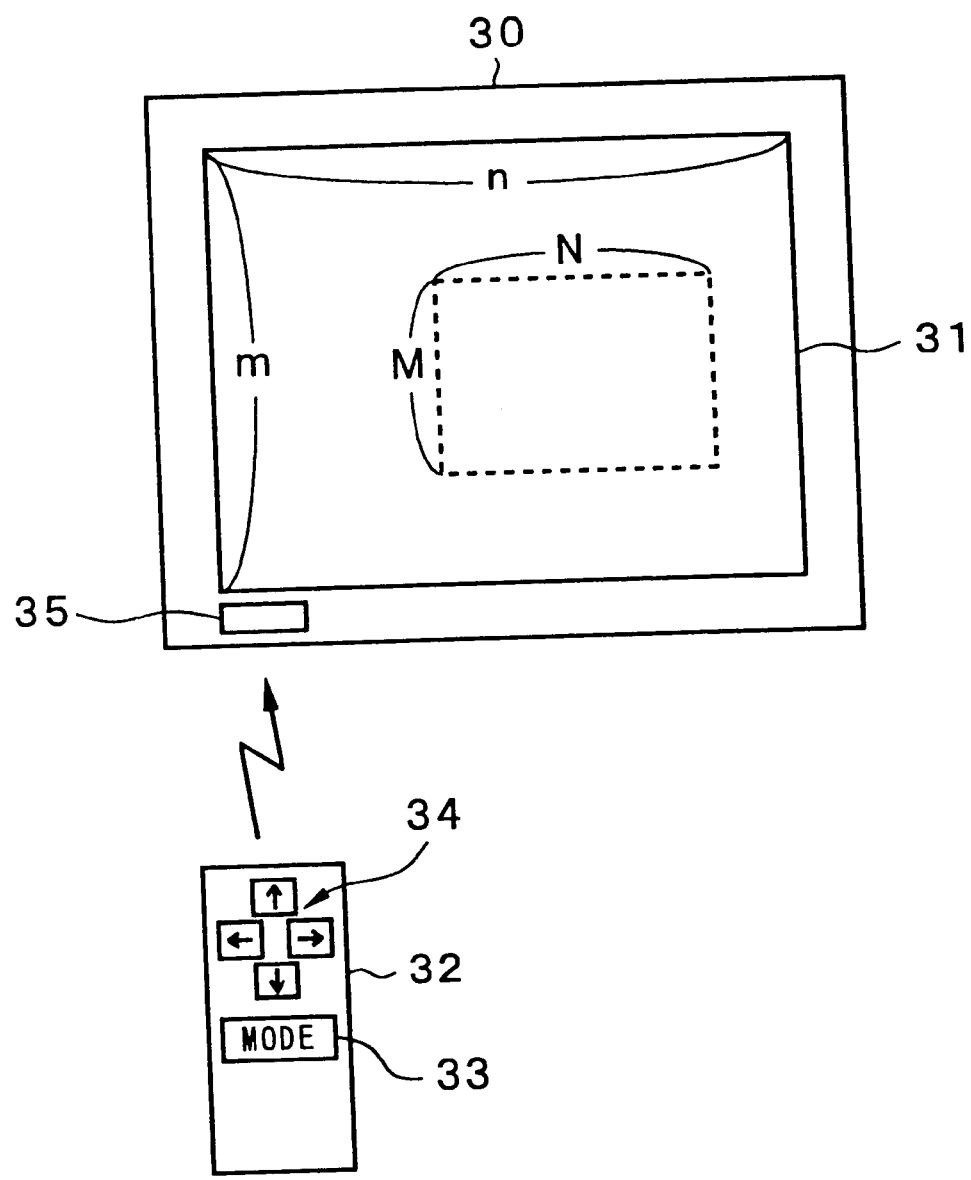
FIG. 3 is a schematic diagram for explaining a reducing operation of a picture on a monitor.

The numbers of pixels n, m, N, and M of the original picture and the converted picture are supplied in the following manner. As shown in FIG. 3, consider the case that on an effective screen 31 of a monitor 30, a picture composed of n pixels in the horizontal direction and m pixels in the vertical direction is reduced to a picture composed of N pixels in the horizontal direction and M pixels in the vertical direction. The user designates a picture enlarging/reducing operation with a remote controller 32 that transmits infrared ray modulated commands to an infrared ray receiving device 35 of the monitor 30.

With the controller 32, a predetermined command that is a combination of key operations of a mode key 33 and arrow keys 34 can be transmitted to the monitor 30. When the user designates a picture reducing operation with the mode key 33, frame lines are displayed on the effective screen 31 for an area of which the original picture is reduced. The frame lines may be displayed around the entire effective screen 31 as an initial setting. With the arrow keys and the mode key 33, the user designates an area for the original picture to be reduced. The command is received by the monitor 30. The area for the original picture is displayed on the monitor 30. Corresponding to the area, the number of pixels n in the horizontal direction of the original picture and the number of pixels m in the vertical direction thereof can be obtained.

Next, the size of the reduced picture is designated. The size of the frame that represents the size of the reduced picture for example displayed to the picture 31 is varied with the arrow keys 34 and the mode key 33 so as to designate the size of the reduced picture. At this point, it is preferred to designate the picture size in such a manner that the ratio of the number of pixels in the horizontal direction of the original picture and the number of pixels in the vertical direction thereof is kept so as to prevent the reduced picture from distorting. In addition, the display position of the reduced picture can be designated. As the picture size of the reduced picture is designated, the number of pixels N in the horizontal direction of the converted picture and the number of pixel M in the vertical direction can be obtained.

The numbers M and N of the obtained numbers N, M, n, and m are supplied to a dividend input terminal of a dividing device 5 through a switch circuit 4a. The numbers of pixels m and n are supplied to a divider input terminal of the divider 5. The switch circuits 4a and 4b are switched corresponding to input signals in the horizontal direction and vertical direction. The dividing device 5 performs dividing operations corresponding to the above-described formulas (2) and (3) with the numbers of pixels N, M, n, and m on time division basis. The dividing device 5 outputs the inverse number 1/A of the converting ratio in the horizontal direction and the inverse number 1/B of the converting ratio in the vertical direction.

As described above, the dividing operations for obtaining the inverse numbers 1/A and 1/B of the converting ratios are performed only when a reduced picture is designated. Thus, the dividing device 5 that operates at low speed can be used. In this example, the dividing device 5 is used on time division basis so as to obtain the inverse numbers 1/A and 1/B of converting ratios in the horizontal direction and the vertical direction. It should be noted that the present invention is not limited to such a structure. In other words, with two dividing devices, dividing operations for obtaining the inverse numbers of the converting ratios in the horizontal direction and vertical direction can be performed independently and in parallel.

It is preferred to determine the accuracy of the dividing device 5 in consideration of the error of the cumulations of the inverse number of the converting ratio and the real picture accuracy. When the accuracy of the output signal of the dividing device 5 is 16 bits, the accuracies of the integer part and the decimal part become 6 bits and 10 bits, respectively.

The inverse number 1/A of the converting ratio in the horizontal direction is supplied to a latch circuit 6 of a horizontal interpolating coefficient generating circuit. The latch circuit 6 latches the received signal and outputs the signal at a timing of a sampling clock $f_s$ received from a terminal 7. The inverse number 1/A of the converting ratio is supplied from the latch circuit 6 to one input terminal of an adding device 8. An output signal of the adding device 8 is supplied to a latch circuit 10 and an address generating circuit 2. In addition, the output signal of the adding device 8 is supplied to a latch circuit 9. The latch circuit 9 outputs the latched signal at the timing of the clock fs as with the above-described latch circuit 6. An output signal of the latch circuit 6 is supplied to another input terminal of the adding device 8. In other words, the adding device 8 adds the inverse number 1/A of the converting ratio received from the latch circuit 6 and an output signal with a delay of $1f_s$ of the adding device 8. Thus, the adding device 8 outputs the cumulative converting ratio $\Sigma(1/A)$.

The cumulative converting ratio $\Sigma(1/A)$ is supplied to the address generating circuit 2 and the latch circuit 10. The address generating circuit 2 extracts an integer part from the received cumulative converting ratio $\Sigma(1/A)$ as a coordinate $X_1$ of which a pixel of the converted picture is reversely mapped. On the other hand, the latch circuit 10 extracts a decimal part from the received cumulative converting ratio $\Sigma(1/A)$ as an interpolating coefficient p. The interpolating coefficient p is supplied to multiplying device 11a and 11b. In addition, the interpolating coefficient p is supplied to an inverting circuit 20. The inverting circuit 20 outputs the complement of '1' of the received value as an inverted output signal. Thus, the inverting circuit 20 outputs the complement (1−p) of '1' of the received coefficient p. The output value (1−p) is supplied to multiplying devices 11c and 11d.

A vertical interpolating coefficient generating circuit performs the same process for the inverse number 1/B of the converting ratio in the vertical direction received from the dividing device 5 as the process for the inverse number 1/A of the converting ratio in the horizontal direction. In other words, the inverse number 1/B of the converting ratio in the vertical direction is supplied to a latch circuit 12. The latch circuit 12 outputs the latched signal at a timing of a horizontal frequency clock $f_h$. The inverse number 1/B of the converting ratio that is received from the latch circuit 12 at the timing of the clock $f_h$ is supplied to one input terminal of an adding device 14. An output signal of the adding device 14 is supplied to a latch circuit 16 and the address generating circuit 2. In addition, the output signal of the adding device 14 is supplied to a latch circuit 15. The latch circuit 15 outputs the latched signal at the timing corresponding to the clock $f_h$. An output signal of the latch circuit 15 is supplied to another input terminal of the adding device 14. Thus, the adding device 14 outputs a cumulative converting ratio $\Sigma(1/B)$.

The cumulative converting ratio $\Sigma(1/B)$ is supplied to the address generating circuit 2 and a latch circuit 16 that has two types of outputs of the complement of '1'. The address generating circuit 2 extracts an integer part from the received cumulative converting ratio $\Sigma(1/B)$ as a coordinate $Y_1$ of which a pixel of the converted picture is reversely mapped. On the other hand, the latch circuit 16 extracts a decimal part from the received cumulative converting ratio $\Sigma(1/B)$ as an interpolating coefficient q. The interpolating coefficient q is supplied to the multiplying devices 11a and 11c. In addition, the interpolating coefficient q is supplied to an inverting circuit 21. The inverting circuit 21 outputs the complement of '1' of the interpolating coefficient q. The inverting circuit 21 outputs the complement (1−q) of 1 of the coefficient q corresponding to the interpolating coefficient q. The output value (1−q) of the inverting circuit 21 is supplied to the multiplying devices 11b and 11d.

The address generating circuit 2 generates addresses for reading coordinates of four points of the original picture for obtaining a density value of a pixel of the converted picture corresponding to the received coordinates $X_1$ and $Y_1$. In other words, the address generating circuit 2 generates addresses $(x_1, y_1)$, $(x_1+1, y_1)$, $(x_1, y_1+1)$, and $(x_1+1, y_1+1)$ for reading pixel data of coordinates $(x_1, y_1)$, $(x_1+1, y_1)$, $(x_1, y_1+1)$, and $(x_1+1, y_1+1)$ of the original picture corresponding to the coordinates $X_1$ and $Y_1$. The generated addresses are supplied to the memories 1a, 1b, 1c, and 1d.

Pixel data (density values) of the coordinates $(x_1, y_1)$, $(x_1+1, y_1)$, $(x_1, y_1+1)$, and $(x_1+1, y_1+1)$ is read from the memories 1a, 1b, 1c, and 1d corresponding to the received addresses. Since the density values at the four points should be read at the same time, the four memories 1a, 1b, 1c, and 1d are required. The density values $d(x_1, Y_1)$, $d(x_1+1, y_1)$, $d(x_1, y_1+1)$, and $d(x_1+1, y_1+1)$ are supplied to multiplying devices 17d, 17b, 17c, and 17a, respectively.

The multiplying devices 11a, 11b, 11c, and 11d to which the complements (1−p) of '1' and (1−q) of '1' of the interpolating coefficients p and q, the multiplying devices 17d, 17c, 17b, and 17a to which the density values $d(x_1, y_1)$, $d(x_1+1, y_1)$, $d(x_1, y_1+1)$, and $d(x_1+1, y_1+1)$ are supplied, and the adding devices 18a, 18b, and 19 perform the operation expressed by the formula (1) so as to obtain the density value of a pixel of the converted picture.

In other words, the multiplying device 11a obtains (p×q). The multiplying device 11b obtains {p×(1−q)}. The results of the operations (p×q) and {p×(1−q)} are supplied to the multiplying devices 17a and 17b, respectively. The multiplying device 11c obtains {(1−p)×q}. The multiplying device 11d obtains {(1−p)×(1−q)}. The results of operations {(1−p)×q} and {(1−p)×(1−q)} are supplied to the multiplying devices 17c and 17d, respectively. The multiplying devices 11a, 11b, 11c, and 11d obtain coefficients of the density values $d(x_1, y_1)$, $d(x_1+1, y_1)$, $d(x_1, y_1+1)$, and $d(x_1+1, y_1+1)$ expressed by the formula (1), respectively.

The multiplying device 17a obtains {(p×q)×d($x_1$+1, $y_1$+1)}. The multiplying device 17b obtains {(p×(1−q))×d($x_1$+1, $y_1$)}. The results of operations {(p×q)×d($x_1$+1, $y_1$+1)} and {(p×(1−q))×d($x_1$+1, $y_1$)} are supplied to the adding device 18a. The multiplying device 17c obtains {((1−p)×q)×d($x_1$, $y_1$+1)}. The multiplying device 17d obtains {((1−p)×(1−q))×d($x_1$, $y_1$)}. The results of operations {((1−p)×q)×d($x_1$, $y_1$+1)} and {((1−p)×(1−q))×d($x_1$, $y_1$)} are supplied to the adding device 18b.

The adding device 18a obtains {(p×q)×d($x_1$+1, $y_1$+1)+(p×(1−q))×d($x_1$+1, $y_1$). The adding device 18b obtains {((1−p)×q)×d($x_1$, $y_1$+1)+((1−p)×(1−q))×d($x_1$, $y_1$). The results of operations {(p×q)×d($x_1$+1, $y_1$+1)+(p×(1−q))×d($x_1$+1, $y_1$)} and {((1−p)×q)×d($x_1$, $y_1$+1)+((1−p)×(1−q))×d($x_1$, $y_1$)} are supplied to the adding device 19. Thus, the operation expressed by the formula (1) is performed and the density value a of a pixel of the converted picture is supplied to an output terminal 20. Corresponding to the density value a, the converted picture is displayed on the screen 31.

Figure 4:
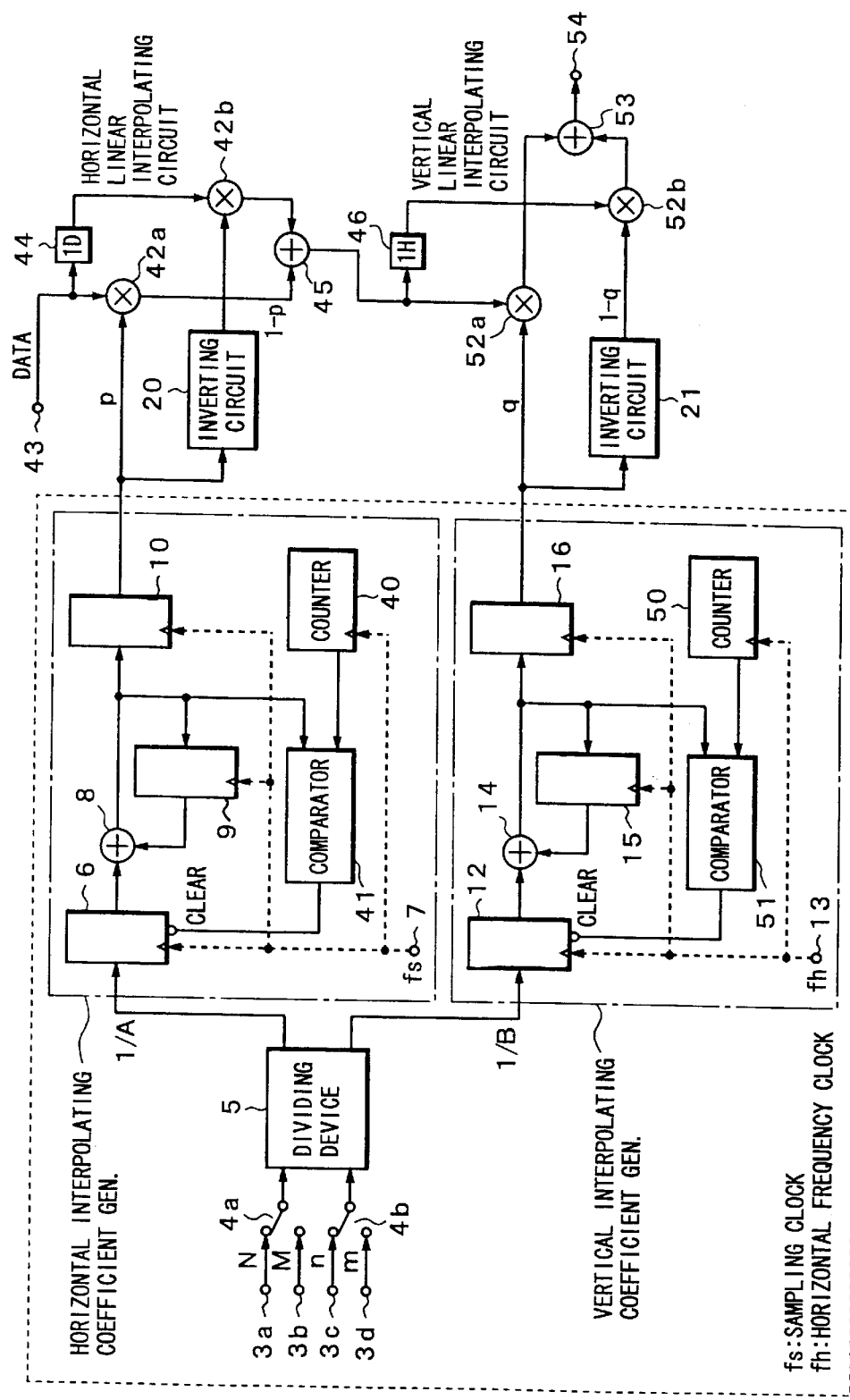
FIG. 4 is a block diagram showing an example of the structure of a picture processing apparatus according to an embodiment of the present invention.
Figure 5:
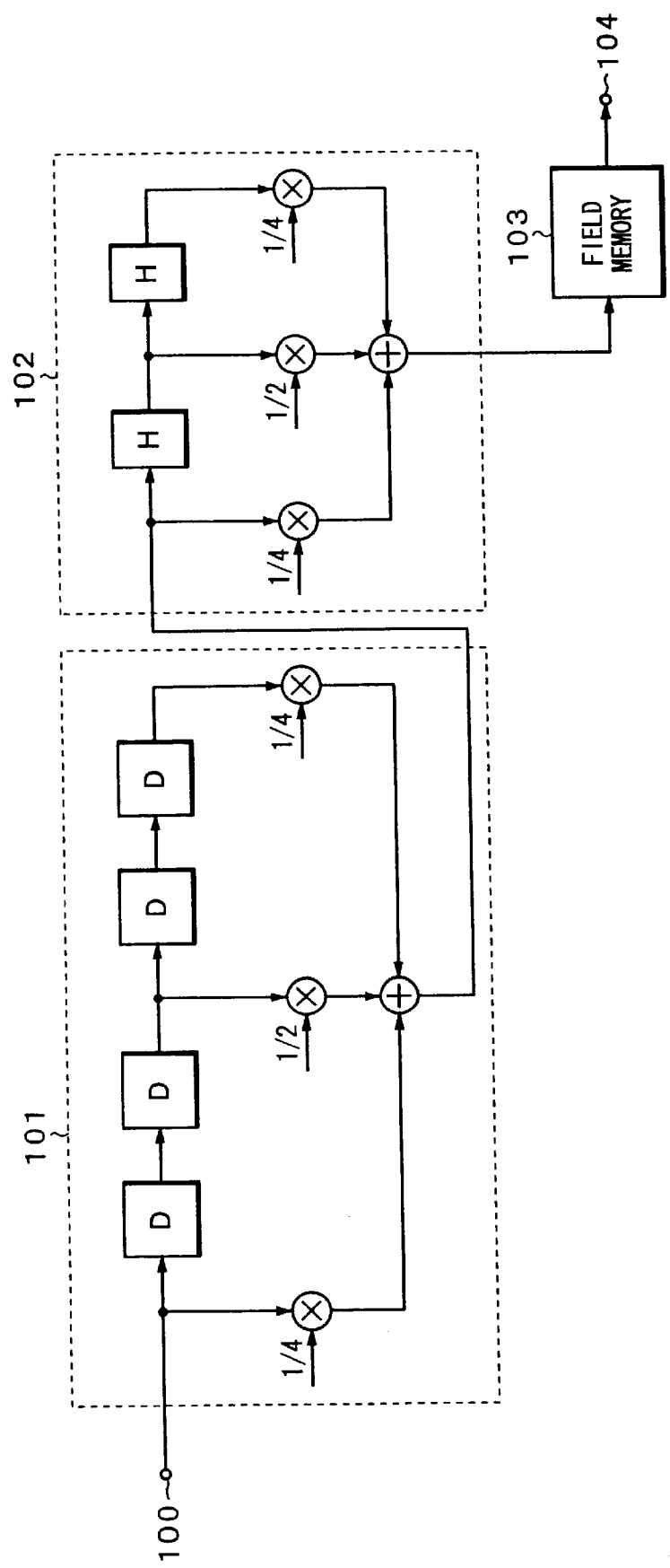
FIG. 5 is a block diagram showing an example of the structure of a filter for reducing/enlarging a picture.
Figure 6:
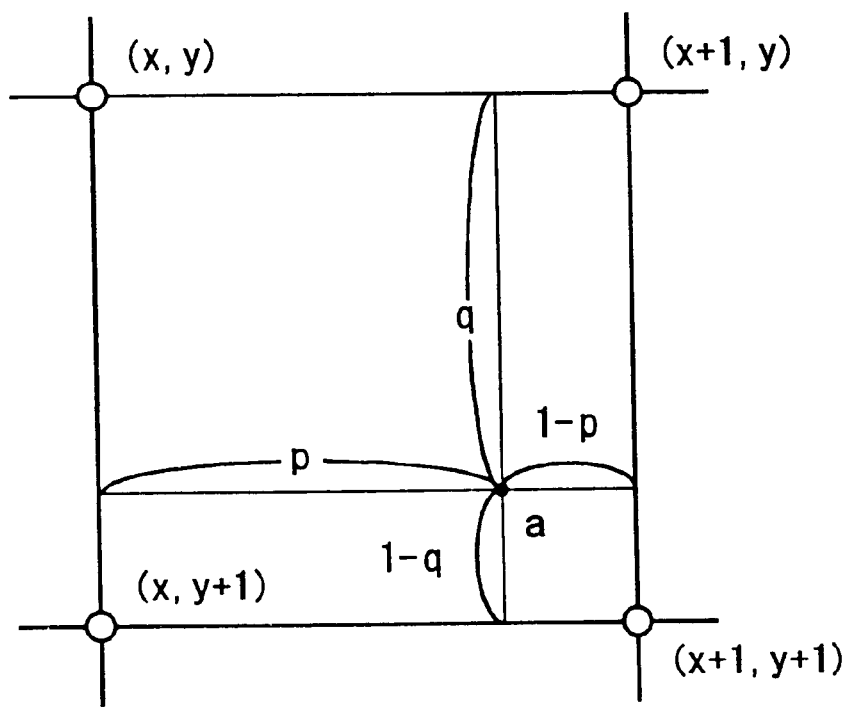
FIG. 6 is a schematic diagram for explaining a reverse mapping operation.
Figure 7:
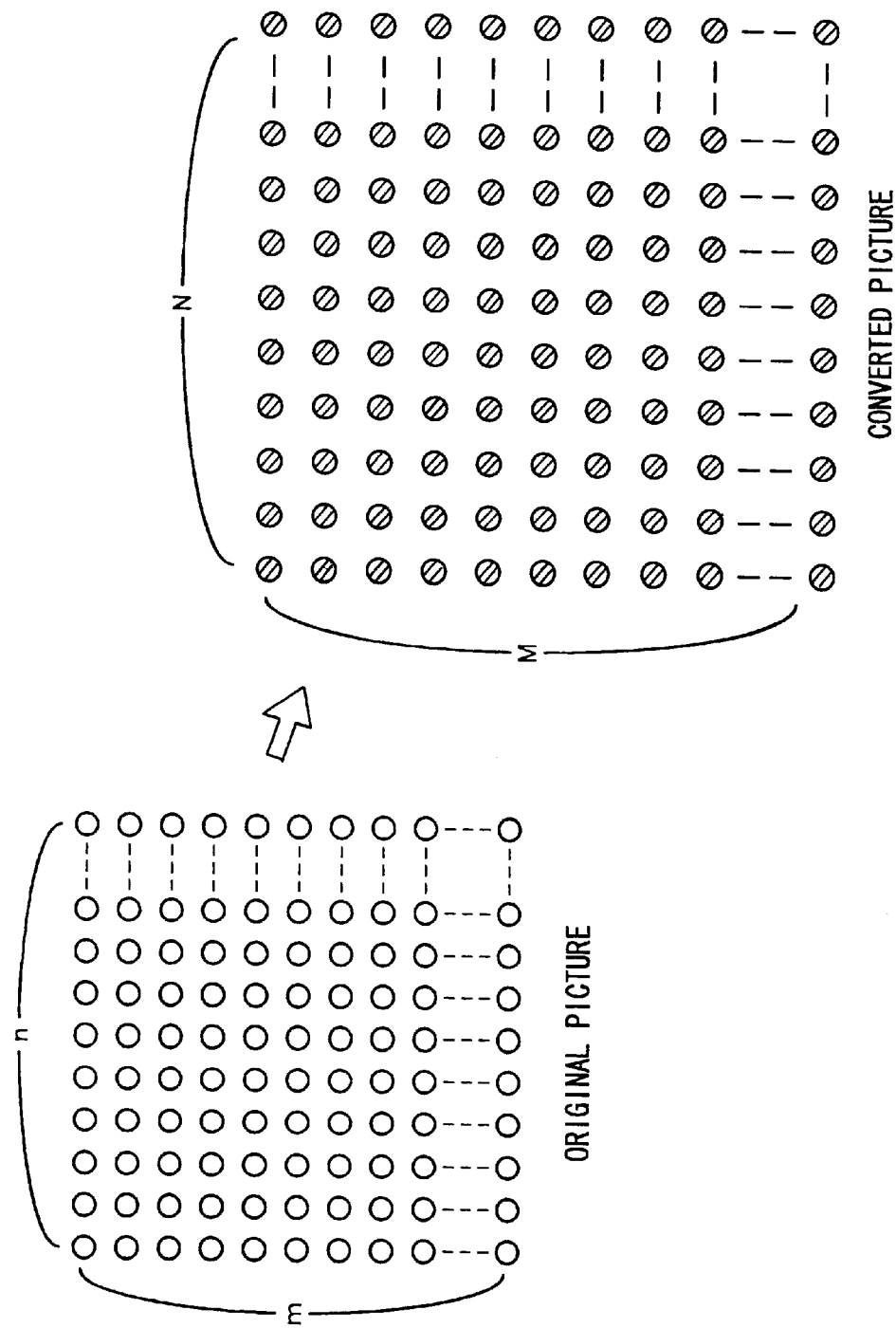
FIG. 7 is a schematic diagram showing the relation between an original picture and a converted picture.
Figure 8:
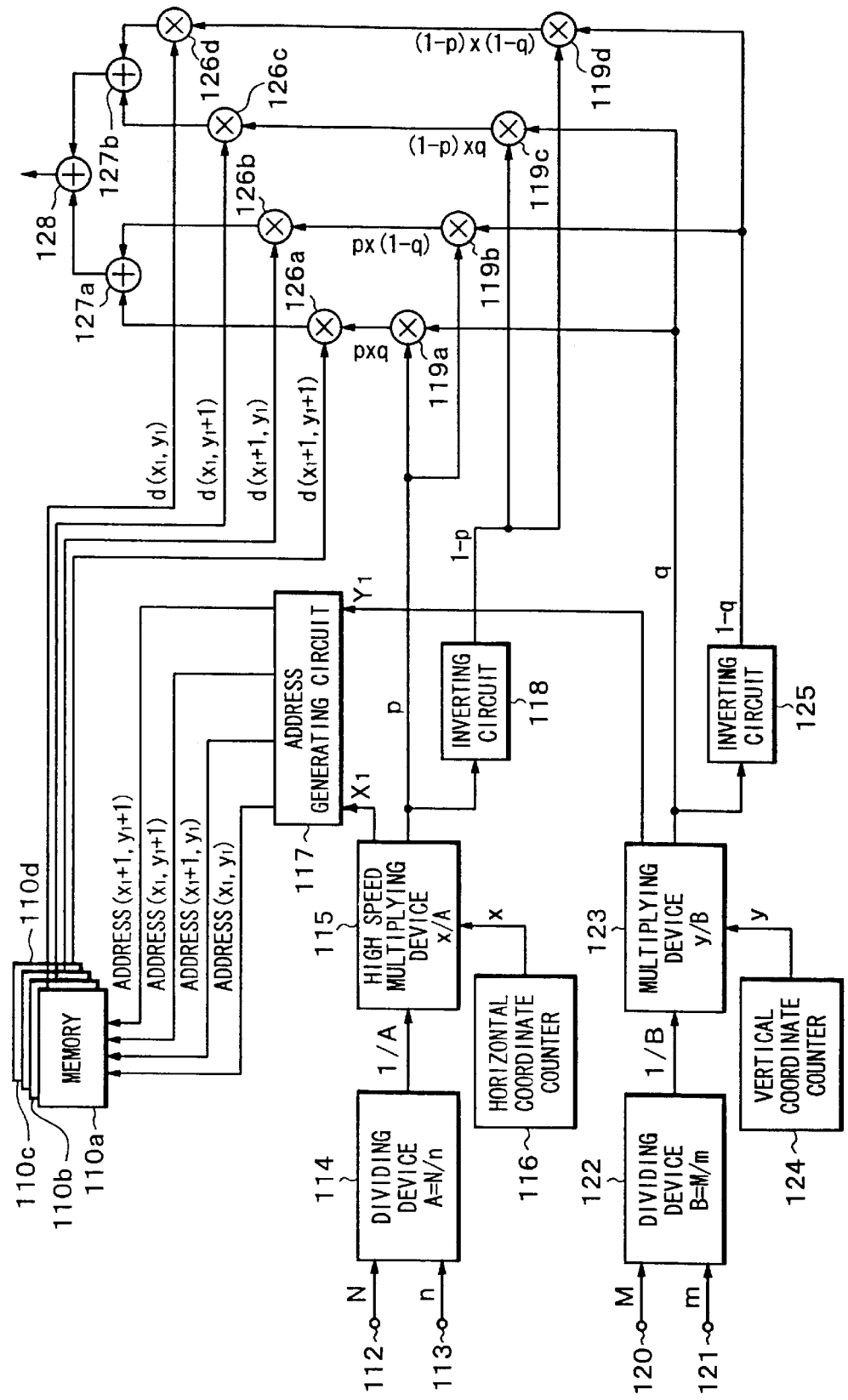
FIG. 8 is block diagram showing an example of the structure for enlarging/reducing a picture corresponding to linear interpolating method.

Next, a second embodiment of the present invention will be described with reference to the accompanying drawing. FIG. 4 shows an example of the structure of a picture processing apparatus according to the second embodiment of the present invention. In this embodiment, a linear interpolating circuit is disposed upstream of the memory. In the linear interpolating circuit shown in FIG. 4, counters 40 and 50 and comparators 41 and 51 are disposed in the horizontal and vertical interpolating coefficient generating circuits of the structure shown in FIG. 2. For simplicity, in FIG. 4, similar portions to those in FIG. 2 are denoted by similar reference numerals and their description is omitted.

The counter 40 of the horizontal interpolating coefficient generating circuit counts pulses of a sampling clock $f_s$ received from a terminal 7. Thus, the count value that is output from the counter 40 accords with the position of a horizontal pixel of the original picture. The count value of the counter 40 is supplied to one input terminal of the comparator 41. An output signal of an adding device 8 is supplied to another input terminal of the comparator 41.

The comparator 41 compares the count value of the counter 40 received from the first input terminal with the output signal of the adding device 8 received from the second input terminal. When the integer part of the output signal of the adding device 8 becomes the count value or more (namely, the cumulative converting ratio $\Sigma(1/A)$ becomes a value that represents the position of a horizontal pixel of the original picture), the comparator 41 outputs a pulse. The pulse is supplied to a clear input terminal of the latch circuit 6. When the pulse is supplied to the clear input terminal, the latch circuit 6 outputs a clear signal with a value of '0' that causes the adding operation of the inverse number 1/A of converting ratio in the adding device 8 to be canceled by one time. Thus, when a pixel position of the original picture accords with that of the converted picture, the cumulating operation of the converting ratio is not performed. Instead, the value of the cumulative converting ratio $\Sigma(1/A)$ is held.

The resultant cumulative converting ratio $\Sigma(1/A)$ is supplied to a latch circuit 10. The latch circuit 10 outputs an interpolating coefficient p. The interpolating coefficient p is supplied to a multiplying device 42a and an inverting circuit 20. The inverting circuit 20 outputs a value (1−p) corresponding to the received coefficient p. The value (1−p) is supplied to a multiplying device 42b.

On the other hand, a vertical interpolating coefficient generating circuit performs the same process as the horizontal interpolating coefficient generating circuit. A counter 50 counts pulses of a horizontal frequency clock $f_h$. The count value of the counter 50 and an output signal of an adding device 14 are supplied to a comparator 51. When the output data of the adding device 14 exceeds the count value of the counter 50, the comparator 51 outputs a pulse. The pulse is supplied to a clear input terminal of the latch circuit 12. Thus, the latch circuit 12 outputs a clear signal. The clear signal causes the cumulating operation of the inverse number 1/B of the converting ratio of the adding device 14 to be canceled. Thus, as with the above-described horizontal interpolating coefficient generating circuit, the value of the cumulative converting ratio $\Sigma(1/B)$ is stored.

The resultant cumulative converting ratio $\Sigma(1/B)$ is supplied to a latch circuit 16. The latch circuit 16 outputs an interpolating coefficient q. The interpolating coefficient q is supplied to a multiplying device 52a and an inverting circuit 21. The inverting circuit 21 outputs a value (1−q) corresponding to the received coefficient q. The value (1−q) is supplied to a multiplying device 52b.

Pixel data (density value) of the original picture corresponding to the clocks $f_s$ and $f_h$ is received from a terminal 43. The density value is supplied to the multiplying device 42a. In addition, the density value is supplied to a delaying circuit 44 with a delay of $1f_s$. When the density value received from the terminal 43 is the density value $d(x_1, y_1)$ of coordinates $(x_1, y_1)$, the density value that has been supplied to the multiplying device 42b through the delaying circuit 44 with a delay of $1f_s$ becomes the density value $d(x_1-1, y_1)$ of coordinates $(x_1-1, y_1)$ Thus, the multiplying device 42a performs an operation $\{p \times d(x_1, y_1)\}$. The multiplying device 42b performs an operation $\{(1-p) \times d(x_1-1, y_1)\}$. The results of operations $\{p \times d(x_1, y_1)\}$ and $\{(1-p) \times d(x_1-1, y_1)\}$ of the multiplying devices 42a and 42b are supplied to an adding device 45. Thus, the adding device 45 performs an operation $\{p \times d(x_1, y_1) + (1-p) \times d(x_1-1, y_1)\}$.

The result of operation of the adding device 45 is supplied to a multiplying device 52a and a delaying circuit 46 with a delay of $1f_h$. The multiplying device 52a performs an operation $\{q \times (p \times d(x_1, y_1) + (1-p) \times d(x_1-1, y_1)\}$. On the other hand, the data supplied to the delaying circuit 46 with a delay of $1f_h$ is delayed for $1f_h$. Thus, the delaying circuit 46 outputs $\{p \times d(x_1, y_1-1) + (1-p) \times d(x_1-1, y_1-1)\}$. The output data of the delaying circuit 46 is supplied to a multiplying device 52b. The multiplying device 52b performs an operation $\{(1-q) \times (p \times d(x_1, y_1-1) + (1-p) \times d(x_1-1, y_1-1))\}$. The results of operations $\{p \times d(x_1, y_1-1) + (1-p) \times d(x_1-1, y_1-1)\}$ and $\{(1-q) \times (p \times d(x_1, y_1-1) + (1-p) \times d(x_1-1, y_1-1))\}$ of the multiplying devices 52a and 52b are supplied to an adding device 53. The adding device 53 performs an operation $\{(q \times (p \times d(x_1, y_1) + (1-p) \times d(x_1-1, y_1))) + ((1-q) \times (p \times d(x_1, y_1-1) + (1-p) \times d(x_1-1, y_1-1)))\}$. Thus, the density value a of a pixel of the converted picture is obtained. The density value a is supplied from an output terminal 54.

The density value a is written as pixel data to a memory (not shown). When the pixel position of the original picture accords with the pixel position of the converted picture, the values of the cumulative converting ratios $\Sigma(1/A)$ and $\Sigma(1/B)$ are held by the counters 40 and 50 and the comparators 41 and 51. The pixel data corresponding to the values of the ratios $\Sigma(1/A)$ and $\Sigma(1/B)$ are thinned out when the pixel data is written to the memory or read therefrom.

In the above-described embodiments, when a picture is enlarged, by controlling the reading operation of pixel data from the memory, the enlarged picture can be partly displayed on the real display screen.

In the above-described embodiments, only one enlarged picture or one reduced picture is displayed. However, the present invention is not limited to such a structure. Instead, when a plurality of picture processing apparatuses according to the present invention are disposed for the monitor 30, a plurality of enlarged/reduced pictures can be displayed on the effective screen 31. In this case, since the dividing device 5 can operate at low speed, it can be shared by the plurality of picture processing apparatuses.

As described above, according to the present invention, by cumulating the converting ratio, an interpolating coefficient for obtaining the density value of a pixel of an enlarged/reduced picture is obtained. The interpolating coefficient can be obtained without need to use a high speed multiplying device. Thus, a picture can be enlarged and reduced at any ratio without a large scale circuit structure.

In addition, according to the present invention, since a picture can be enlarged and reduced at any ratio with a small scale circuit structure, with a plurality of picture processing apparatuses disposed in one monitor, a plurality of enlarged/reduced pictures can be easily displayed on one screen.

Moreover, according to another embodiment of the present invention, with only one memory, enlarged/reduced picture data can be written.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A picture processing apparatus for enlarging/reducing a picture formed of pixels of digital data by any selected ratio, comprising:

a display monitor for displaying an original picture;

user input means for enabling a user to select a selected picture size for an enlarging/reducing process by manipulating the user input means to vary a size and a position of the selected picture size while the selected picture size is displayed on the display monitor by displaying frame lines to give the user visual feedback of the selection before performing the enlarging/reducing process;

means for obtaining a converting ratio by using a number of pixels of the original picture to be reduced/enlarged as a denominator and a number of pixels of a converted picture as a numerator in response to the selected picture size;

cumulating means for cumulating an inverse of the converting ratio for each pixel of the original picture and producing a result;

position information generating means for generating position information for original pixel data to be interpolated using a value of an integer part of the result produced by the cumulating means;

interpolating means for interpolating the original pixel data so as to obtain a value for a converted pixel; and interpolation coefficient generating means for generating an interpolation coefficient corresponding to a decimal part of the result produced by the cumulating means, the interpolation coefficient being used by the interpolating means for interpolating the original pixel data thus generating the converted picture, wherein the interpolation coefficient generating means includes a counter for counting pulses of a sampling clock and producing a count value based on the pulses counted, and a comparator for comparing the count value with an output value from the cumulating means and producing a pulse when the count value is equal to or greater than the output value from the cumulating means; and means for displaying the converted picture on the original picture on the display monitor.

2. A picture processing method for enlarging/reducing a picture formed of pixels of digital data by any selected ratio, comprising the steps of:

displaying an original picture on a display monitor;

inputting a user-selected picture size for an enlarging/reducing process by enabling a user to vary a size and a position of the user-selected picture size while the user-selected picture size is displayed on the display monitor by displaying frame lines to give the user visual feedback of the selection before performing the enlarging/reducing process;

obtaining a converting ratio by using a number of pixels of the original picture to be reduced/enlarged as a denominator and a number of pixels of a converted picture as a numerator in response to the user-selected picture size;

cumulating an inverse of the converting ratio for each pixel of the original picture and producing a result;

generating position information for original pixel data to be interpolated using a value of an integer part of the result produced in the cumulating step;

generating an interpolation coefficient corresponding to a decimal part of the result produced in the cumulating step;

interpolating the original pixel data, thus generating the converted picture, using the interpolation coefficient so as to obtain a value for a converted pixel;

counting pulses of a sampling clock and producing a count value based on the pulses counted;

comparing the count value with an output value from the cumulating step and producing a pulse when the count value is equal to or greater than the output value from the cumulating step; and displaying the converted picture on the original picture on the display monitor.

3. The picture processing apparatus as set forth in claim 1, wherein the interpolating means linearly interpolates the original pixel data.

4. The picture processing apparatus as set forth in claim 1, further comprising a memory for storing picture data wherein a plurality of pixel data necessary for interpolating the original pixel data is read from the memory using the position information.

5. The picture processing apparatus as set forth in claim 1, wherein output data from the interpolating means is written to a memory, and when the output data is written to the memory or read therefrom pixels are thinned out.

6. The picture processing method as set forth in claim 2, wherein the step of interpolating linearly interpolates the original pixel data.

7. The picture processing method as set forth in claim 2, further comprising the step of storing picture data in a memory, wherein a plurality of pixel data necessary for interpolating the original pixel data is read from the memory using the position information.

8. The picture processing method as set forth in claim 2, wherein output data from the step of interpolating is written to a memory, and when the output data is written to the memory or read therefrom pixels are thinned out.

9. The picture processing apparatus as set forth in claim 1, further comprising clearing means for setting a cumulation value of the cumulating means to zero when the comparator produces the pulse.

10. The picture processing method as set forth in claim 2, further comprising the step of setting a cumulation value of the cumulating step to zero when the pulse is produced in the comparing step.

* * * * *